United States Patent [19]
Sato

[11] Patent Number: 5,442,486
[45] Date of Patent: Aug. 15, 1995

[54] SUPER-TELEPHOTO ZOOM LENS

[75] Inventor: Susumu Sato, Chiba, Japan

[73] Assignee: Nikon Corporation, Tokyo, Japan

[21] Appl. No.: 291,505

[22] Filed: Aug. 17, 1994

Related U.S. Application Data

[63] Continuation of Ser. No. 40,620, Mar. 31, 1993, abandoned.

[30] Foreign Application Priority Data

Apr. 27, 1992 [JP] Japan .................. 4-107522

[51] Int. Cl.⁶ ............................................. G02B 15/14
[52] U.S. Cl. .................... 359/690; 359/684; 359/557
[58] Field of Search .................... 359/690, 684, 557

[56] References Cited

U.S. PATENT DOCUMENTS

| 4,848,883 | 7/1989 | Maruyama | 359/684 |
| 5,136,430 | 8/1992 | Hamanishi | 359/684 |

FOREIGN PATENT DOCUMENTS

59-23314  2/1984  Japan .

Primary Examiner—Scott J. Sugarman
Attorney, Agent, or Firm—Shapiro and Shapiro

[57] ABSTRACT

An internal focus super-telephoto zoom lens comprises, in succession from the object side, a first lens unit having positive refractive power, a second lens unit having negative refractive power, and a third lens unit having positive refractive power. During vari-focusing from the wide angle end to the telephoto end, the first lens unit is fixed relative to the image plane and the second lens unit and the third lens unit are moved on the optical axis thereof so as to narrow the air gap therebetween. The first lens unit has, in succession from the object side, a lens group having positive refractive power, a lens group having negative refractive power, and a lens group having positive refractive power. The lens group having negative refractive power is moved on the optical axis to thereby effect focusing. The super-telephoto zoom lens satisfies various predetermined conditions.

10 Claims, 4 Drawing Sheets

FIG.3

SUPER-TELEPHOTO ZOOM LENS

This is a continuation of application Ser. No. 08/040,620 filed Mar. 31, 1993, now abandoned.

BACKGROUND OF THE INVENTION

1. Field of the Invention

This invention relates to a super-telephoto zoom lens suitable as an interchangeable lens for a single-lens reflex camera, an electronic still camera or the like.

2. Related Background Art

Usually, it is often the case that a super-telephoto lens photographs distant objects, and once the camera is installed, it is impossible to simply change the photographing distance as when carrying about a medium-telephoto lens or a wide angle lens and interchanging it. Thus, a super-telephoto zoom lens which can select angles of view from telephoto to super-telephoto in a moment with a camera fixed at a certain location compares with one photo-taking lens which yet provides several telephoto or super-telephoto lenses prepared.

Now, in most focusing systems for conventional popular zoom lenses, a lens unit which is disposed forwardly of a vari-focusing portion and most adjacent to the object side is moved toward the object side along the optical axis thereof to thereby effect focusing and therefore, particularly a telephoto zoom lens in which even at the wide angle end, the focal length of the whole system is very long has the tendency that the focal length of a first lens unit becomes long, and the amount of movement for focusing becomes great, and this has led to bulky and complicated structure. In addition, it is difficult to use a zoom lens including a telephoto area and in which the position of the centroid fluctuates greatly during vari-focusing. Also, conventional zoom lenses have suffered from the disadvantage that their brightness is dark as compared with that of single-piece telephoto lenses. So, applicant proposed in Japanese Laid-Open Patent Application No. 59-23314 an internal focus telephoto zoom lens as a telephoto zoom lens which eliminates these disadvantages.

However, in the internal focus telephoto zoom lens disclosed in Japanese Laid-Open Patent Application No. 59-23314, the focal length at the telephoto end is of the order of 800 mm and the angle of view has not been sufficiently small. Also, most telephoto lenses of which the focal length exceeds 800 mm are single-focus lenses and it is impossible for them to move in a-moment to effect predetermined framing, and there has been no way but to substitute the trimming during enlargement for such framing.

SUMMARY OF THE INVENTION

It is therefore an object of the present invention to provide a super-telephoto zoom lens in which the half angle of view at the wide angle end is equal to or less than 1.7° and which can accomplish free framing in the super-telephoto focus area and which is excellent in operability and compact and has a sufficinetly bright F number.

To achieve the above object, a super-telephoto zoom lens according to an embodiment of the present invention includes, in succession from the object side, a first lens unit G10 having positive refractive power, a second lens unit G20 having negative refractive power, and a third lens unit G30 having positive refractive power, the first lens unit G10 being fixed relative to the image plane and the second lens unit G20 and the third lens unit G30 being moved so as to narrow the air space therebetween during changing the focal length from the wide angle end to the telephoto end, the first lens unit G10 including, in succession from the object side, a lens group G11 having positive refractive power, a lens group G12 having negative refractive power, and a lens group G13 having positive refractive power, the lens group G12 being designed to be moved in the direction of the optical axis to effect focusing.

Further, the super-telephoto zoom lens is designed to satisfy the following conditions:

$$0.15 \leq f_{11}/f_w \leq 0.40 \quad (1)$$

$$0.5 \leq f_{10}/f_w \leq 1.1, \quad (2)$$

where $f_{11}$: the focal length of the lens group $G_{11}$ in the first lens unit G10;

$f_{10}$: the focal length of the first lens unit G10;

$f_w$: the focal length of the whole system of the super-telephoto zoom lens at the wide angle end.

The present invention of the above-described construction is designed to satisfy conditions (1) and (2) above.

Conditional expression (1) is a conditional expression for prescribing the focal length of the lens group G11 in the first lens unit G10, and if the lower limit of this conditional expression is exceeded, the refractive power of the lens group G11 in the first lens unit G10 will become too strong and the bending of the on-axis secondary chromatic aberration and the spherical aberration during close distance photographing will become great and the correction thereof will become difficult, and this is not preferable. If conversely, the upper limit of this conditional expression is exceeded, the amount of movement of the lens group G12 in the first lens unit G10 for close distance photographing will become too great and focusing hardware will become bulky and the full length of the photographing optical system will become great, and this is against the object of the present invention and is not preferable.

Conditional expression (2) is a conditional expression for prescribing the focal length of the first lens unit G10 at the wide angle end of the entire photographing optical system. If the lower limit of this conditional expression (2) is exceeded, the fluctuation of spherical aberration by the vari-focusing of the focal length will be great and the correction thereof will become difficult, and this is not preferable. If conversely, the upper limit of this conditional expression is exceeded, the full length of the photographing optical system will become great, and this is not preferable.

Also, generally in an internal focus zoom lens, it is often the case that the amount of movement of a focusing lens unit differs due to a variation in the focal length. In the super-telephoto zoom lens according to the present invention, however, focusing is effected by only the lens group G12 in the first lens unit G10 being moved and therefore, the amount of movement of the lens group G12 required for focusing is constant irrespective of any variation in the focal length if at the same photographing distance. This leads to the advantage that the operability during focusing is improved.

To further shorten the full length, when the magnification used of the second lens unit G20 and the third lens unit G30 at the wide angle end are $\beta_{20}$ and $\beta_{30}$, respectively, it is preferable that $\beta_{20}$ and $\beta_{30}$ be as follows:

$$0.9 \leq |\beta_{20}| \leq 1.4 \qquad (3)$$

$$0.9 \leq |\beta_{30}| \leq 1.4 \qquad (4)$$

Both of conditional expressions (3) and (4) are conditional expressions for making the focal length $f_{10}$ of the first lens unit G10 as small as possible. If the lower limits of these conditional expressions are exceeded, the focal length $f_{10}$ of the first lens unit G10 will become great, which in turn will result in an increase in the full length, and this is not preferable. If conversely, the upper limits of these conditional expressions are exceeded, the fluctuation of spherical aberration will result and the correction thereof will become difficult, and this is not preferable.

Further, when the half angle of view at the wide angle end is $\theta_w$ (unit: degrees) and the effective diameter of the first surface of the first lens unit G10 is $\phi_{10}$, it is desirable that the following condition be satisfied:

$$4.0 \times 10^{-6} < \theta_w/\phi_{10} < 9.0 \times 10^{-3} \qquad (5)$$

If the lower limit of this conditional expression (5) is exceeded, it will become difficult to shorten the focal length $f_{10}$ of the first lens unit G10, and this is not preferable. If conversely, the upper limit of this conditional expression is exceeded, F number will become dark and the shutter speed will tend to become slow and as a result, blur will become apt to occur, and this is not preferable.

Also, in order to obtain good chromatic aberration, the lens group G11 in the first lens unit G10 has at least two positive lenses and one or more negative lenses, and when the Abbe number of said at least two positive lenses is $\nu d$, it is preferable that $\nu d$ be as follows:

$$\nu d > 70 \qquad (6)$$

In the present invention, the focal length $f_{11}$ of the lens group G11 in the first lens unit G10 tends to become small to shorten the full length. In addition, in order to make a super-telephoto lens (in order to increase the focal length of the whole system), said focal length $f_{11}$ is enlarged by the lens group G12 in the first lens unit G10 to the third lens unit G30. At this time, the chromatic aberration by the lens group G11 is enlarged and therefore, it is desirable that the chromatic aberration of the lens group G11 be as small as possible.

So, in the super-telephoto zoom lens according to the present invention, it is preferable that a material of great Abbe number be used for at lest two of the positive lenses in the lens group G11, and it is preferable that condition (6) be satisfied.

Further, in order to obtain good aberrations, it is desirable that each of the lens group G11 and lens group G12 in the first lens unit G10, the second lens unit G20 and the third lens unit G30 include at least one positive lens and at least one negative lens. Also, in order to obtain good aberrations, it is desirable that each of the lens group G11, lens group G12 and lens group G13 in the first lens unit G10, the second lens unit G20 and the third lens unit G30 have at lest one cemented surface.

Also, in recent years, there is known an optical system in which some lens units are movably provided to obtain an image stabilizing effect. If in the super-telephoto zoom lens according to the present invention, the lens group G13 in the first lens unit G10 is provided for movement in a direction perpendicular to the optical axis, there can be obtained an image stabilizing effect.

The image stabilizing effect refers to the effect that by the utilization of the action of a position at which an image is formed shifting when some lens units of an optical system are moved in a direction perpendicular to the optical axis, said some lens units are moved even when the entire optical system vibrates, whereby the image formed position can be maintained constant.

Other objects, features and effects of the present invention will become fully apparent from the following detailed description taken in conjunction with the accompanying drawings.

DETAILED DESCRIPTION OF THE PREFERRED EMBODIMENTS

Some embodiments of the present invention will hereinafter be described in detail with reference to the accompanying drawings.

Each of Embodiments 1 to 4 of the present invention comprises, in succession from the object side, a first lens unit G10 having positive refractive power, a second lens unit G20 having negative refractive power, and a third lens unit G30 having positive refractive power, the first lens unit G10 having, in succession from the object side, a lens group G11 having positive refractive power, a lens group G12 having negative refractive power, and a lens group G13 having positive refractive power. During the changing focal length from the wide angle end to the telephoto end, the first lens unit G10 is fixed relative to the image plane and the second lens unit G20 and the third lens unit G30 are moved on the optical axis so as to decrease the air gap therebetween. Also, the lens group G12 in the first lens unit G10 is moved on the optical axis toward the image side, whereby focusing on a short distance object is effected.

Since only the lens group G12 which is the only movable group in the first lens unit G10 fixed relative to the image plane and disposed most adjacent to the object side is moved to thereby effect focusing, the amount of movement of the lens group G12 required for focusing is constant irrespective of the focal length if at the same photographing distance.

Also, when the photographing distance $R = \infty$, the combined focal length of the lens group G11 and lens group G12 in the first lens unit G10 is substantially infinite.

Each embodiment will hereinafter be described.

Embodiment 1

Figure 1:
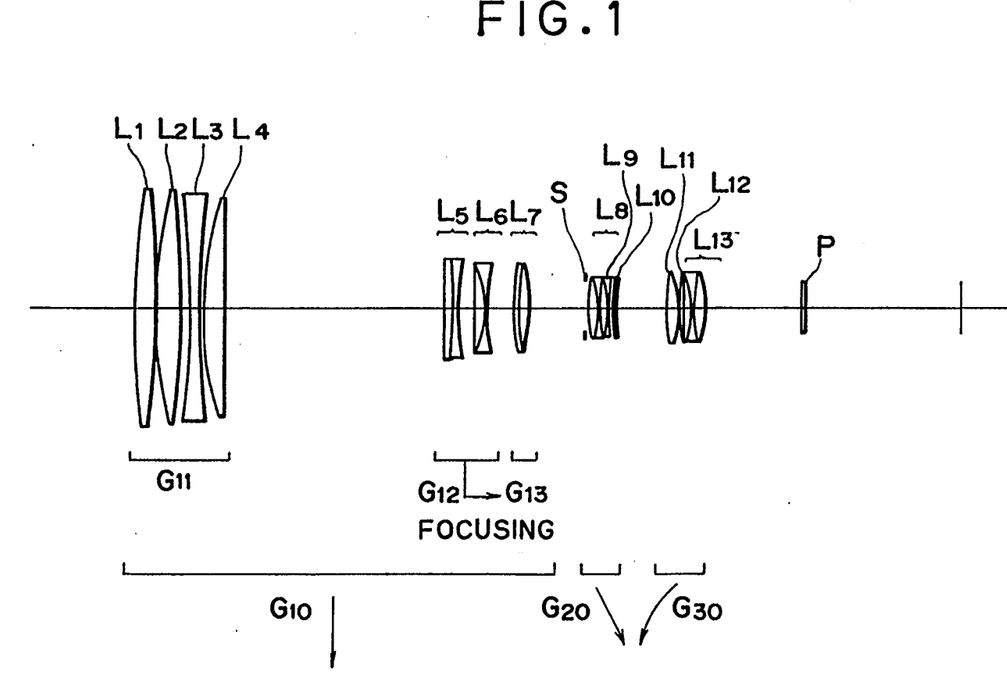
FIG. 1 shows the lens construction of a first embodiment of the present invention.

The lens construction of Embodiment 1 of the present invention is shown in FIG. 1. Embodiment 1 comprises, in succession from the object side, a first lens unit G10 having a lens group G11 having a biconvex lens L1, a biconvex lens L2, a biconcave lens L3 and a positive meniscus lens L4 having its convex surface facing the object side, a lens group G12 having a cemented lens L5 comprising a positive lens and a negative lens cemented together, and a cemented lens L6 comprising a positive lens and a negative lens cemented together, and a lens group G13 comprising a cemented lens L7 comprising a negative lens and a positive lens cemented together, an aperture stop S, a second lens unit G20 having a cemented lens L8 comprising a positive lens and a negative lens cemented together, a biconcave negative lens L9 and a positive meniscus lens L10, a third lens unit G30 comprising a biconvex lens L11, a biconvex lens L12 and a cemented lens L13 comprising a negative lens and a positive lens cemented together, and a filter P.

The numerical data of Embodiment 1 of the present invention are shown below. In the table below, f represents the focal length, and $F_{NO}$ represents the F number. The numbers at the left end represents the order from the object side, r represents the radius of curvature of each lens surface, d represents the thickness of each lens or the spacing between adjacent lens surfaces, $\nu$ represents the Abbe number of each lens, n represents the refractive index of each lens for d line ($\lambda = 587.6$ nm), $\beta$ represents the photographing magnification at a close distance, d0 represents the distance from the object to the surface most adjacent to the object side, and Bf represents the back focal length.

(Values of Various Data of Embodiment 1)
f=800–1200
$\beta = -0.1$ – $-0.14$
$F_{NO} = 4.0$–6.0
Telephoto ratio=0.91–0.61

TABLE 1

|   | r | d | $\nu$ | n |
|---|---|---|---|---|
| 1 | 709.700 | 17.00 | 82.3 | 1.49782 |
| 2 | −1279.405 | 1.00 | | |
| 3 | 398.378 | 24.00 | 82.3 | 1.49782 |
| 4 | −676.200 | 7.60 | | |
| 5 | −616.347 | 8.00 | 35.2 | 1.74950 |
| 6 | 854.347 | 2.00 | | |
| 7 | 285.133 | 18.00 | 82.3 | 1.49782 |
| 8 | 2286.353 | (d8) | | |
| 9 | −2232.426 | 8.00 | 26.1 | 1.78470 |
| 10 | −269.584 | 4.00 | 58.5 | 1.65160 |
| 11 | 211.055 | 12.80 | | |
| 12 | 766.146 | 8.00 | 38.1 | 1.60342 |
| 13 | −182.948 | 3.50 | 58.5 | 1.65160 |
| 14 | 145.091 | (d14) | | |
| 15 | 235.889 | 2.90 | 35.2 | 1.74950 |
| 16 | 154.083 | 11.00 | 82.3 | 1.49782 |
| 17 | −158.414 | (d17) | | |
| 18 | 156.127 | 7.00 | 27.6 | 1.74077 |
| 19 | −127.239 | 2.00 | 54.0 | 1.71300 |
| 20 | 89.694 | 6.30 | | |
| 21 | −105.060 | 2.50 | 55.6 | 1.69680 |
| 22 | 172.585 | 1.50 | | |
| 23 | 96.524 | 4.00 | 38.1 | 1.60342 |
| 24 | 115.032 | (d24) | | |
| 25 | 131.911 | 11.70 | 70.2 | 1.48749 |
| 26 | −87.486 | 0.35 | | |
| 27 | 187.653 | 5.60 | 70.2 | 1.48749 |
| 28 | −505.669 | 4.20 | | |
| 29 | −89.875 | 3.55 | 35.2 | 1.74950 |
| 30 | 203.711 | 7.45 | 50.8 | 1.65844 |
| 31 | −152.769 | 60.00 | | |
| 32 | 0.000 | (d32) | | |
| 33 | 0.000 | 2.00 | 64.1 | 1.51680 |
| 34 | | (Bf) | | |

| (variable spacing for changing the focal length) | | | |
|---|---|---|---|
| F | 799.9996 | 1000.0000 | 1199.9998 |
| D0 | ∞ | ∞ | ∞ |
| d8 | 196.5594 | 196.5594 | 196.5594 |
| d14 | 24.8200 | 24.8200 | 24.8200 |
| d17 | 51.7644 | 58.1784 | 63.5223 |
| d24 | 43.2728 | 20.4290 | 1.7267 |

TABLE 1-continued

| d32 | 30.0000 | 46.4299 | 59.7882 |
|---|---|---|---|
| Bf | 134.8937 | 134.8937 | 134.8937 |
| $\beta$ | −0.0901 | −0.1126 | −0.1351 |
| D0 | 9272.7629 | 9272.7629 | 9272.7629 |
| d8 | 214.5725 | 214.5725 | 214.5725 |
| d14 | 6.8069 | 6.8069 | 6.8069 |
| d17 | 51.7644 | 58.1784 | 63.5223 |
| d24 | 43.2728 | 20.4290 | 1.7267 |
| d32 | 30.0000 | 46.4299 | 59.7882 |
| Bf | 134.8937 | 134.8937 | 134.8937 |

(Condition-corresponding numerical values)

(1) $f_{11}/f_w = 0.20$
(2) $f_{10} = 615.4$; $f_{10}/f_w = 0.77$
    $f_{10} = 585.6$; $f_{10}/f_w = 0.63$
(3) $|\beta_{20}| = 1.21$
(4) $|\beta_{30}| = 1.08$
(5) $\theta_w/\phi_{10} = 7.7 \times 10^{-3}$
(6) Positive lens L1; $\nu d = 82.28$
    Positive lens L2; $\nu d = 82.28$
    Positive lens L4; $\nu d = 82.28$ Embodiment 2

Figure 2:
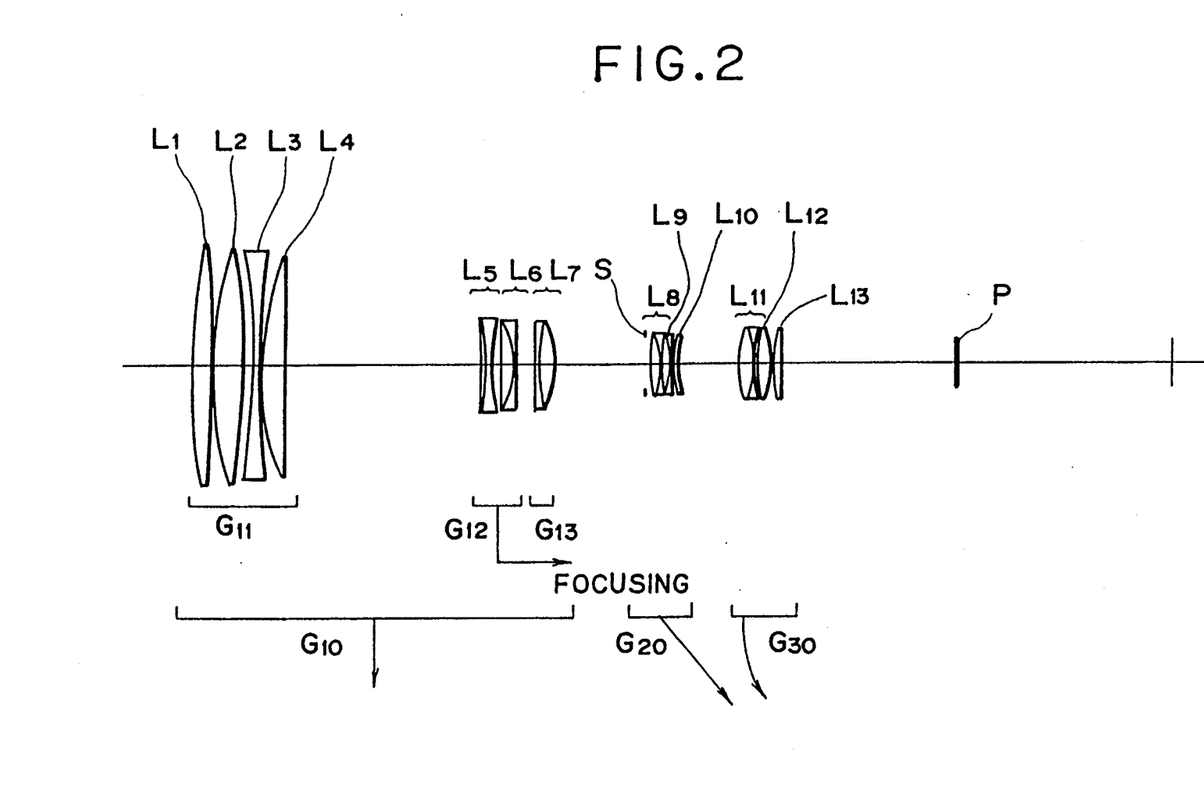
FIG. 2 shows the lens construction of a second embodiment of the present invention.

The lens construction of Embodiment 2 of the present invention is shown in FIG. 2. This embodiment comprises, in succession from the object side, a first lens unit G10 having a lens group G11 comprising a biconvex lens L1, a biconvex lens L2, a biconcave lens L3 and a positive meniscus lens L4 having its convex surface facing the object side, a lens group G12 comprising a cemented lens L5 comprising a positive lens and a negative lens cemented together, and a cemented lens L6 comprising a positive lens and a negative lens cemented together, and a lens group G13 comprising a cemented lens L7 comprising a negative lens and a positive lens cemented together, an aperture stop S, a second lens unit G20 comprising a cemented lens L8 comprising a positive lens and a negative lens cemented together, a biconcave negative lens L9 and a positive meniscus lens L10, a third lens unit G30 having a cemented lens L11 comprising a positive lens and a negative lens cemented together, a biconvex lens L12 and a positive lens L13, and a filter P.

The numerical data of Embodiment 2 of the present invention are shown below. In the table below, f represents the focal length, and $F_{NO}$ represents the F number. The numbers at the left end represents the order from the object side, r represents the radius of curvature of each lens surface, d represents the thickness of each lens or the spacing between adjacent lens surfaces, $\nu$ represents the Abbe number of each lens, n represents the refractive index of each lens for d line ($\lambda = 587.6$ nm), $\beta$ represents the photographing magnification at a close distance, d0 represents the distance from the object to the surface most adjacent to the object side, and Bf represents the back focal length.

(Values of Various Data of Embodiment 2)
f=1200–1700
$\beta = -0.14$ – $-0.19$
$F_{NO} = 5.8$–8.3
Telephoto ratio=0.72–0.51

TABLE 2

|   | r | d | $\nu$ | n |
|---|---|---|---|---|
| 1 | 662.496 | 15.50 | 82.6 | 1.49782 |
| 2 | −1331.120 | 2.00 | | |
| 3 | 362.280 | 27.00 | 82.6 | 1.49782 |
| 4 | −594.822 | 8.20 | | |
| 5 | −551.673 | 7.00 | 35.2 | 1.74950 |
| 6 | 931.399 | 0.30 | | |

TABLE 2-continued

| | | | | |
|---|---|---|---|---|
| 7 | 271.380 | 19.00 | 82.6 | 1.49782 |
| 8 | 4380.755 | (d8) | | |
| 9 | −725.319 | 4.50 | 25.5 | 1.80458 |
| 10 | −333.326 | 3.80 | 55.6 | 1.69680 |
| 11 | 146.921 | 9.00 | | |
| 12 | −707.821 | 9.80 | 25.5 | 1.80458 |
| 13 | −93.487 | 2.80 | 40.9 | 1.79631 |
| 14 | 573.010 | (d14) | | |
| 15 | 2101.620 | 4.20 | 35.2 | 1.74950 |
| 16 | 278.151 | 11.60 | 82.6 | 1.49782 |
| 17 | −133.619 | (d17) | | |
| 18 | 145.569 | 7.30 | 28.2 | 1.74000 |
| 19 | −188.766 | 2.90 | 51.1 | 1.73350 |
| 20 | 103.723 | 7.00 | | |
| 21 | −165.421 | 3.70 | 45.4 | 1.79668 |
| 22 | 338.633 | 0.10 | | |
| 23 | 88.774 | 4.00 | 32.2 | 1.67270 |
| 24 | 91.784 | (d24) | | |
| 25 | 105.641 | 8.90 | 60.0 | 1.64000 |
| 26 | −374.291 | 4.00 | 40.9 | 1.79631 |
| 27 | 111.205 | 5.00 | | |
| 28 | 261.949 | 8.10 | 70.4 | 1.48749 |
| 29 | −182.824 | 5.00 | | |
| 30 | 179.824 | 5.70 | 70.4 | 1.48749 |
| 31 | −3937.673 | 120.00 | | |
| 32 | 0.000 | (d32) | | |
| 33 | 0.000 | 2.00 | 64.1 | 1.51680 |
| 34 | 0.000 | (Bf) | | |

(variable spacing for changing the focal length)

| F | 1199.9585 | 1449.9576 | 1699.9292 |
|---|---|---|---|
| D0 | ∞ | ∞ | ∞ |
| d8 | 174.4226 | 174.4226 | 174.4226 |
| d14 | 16.1826 | 16.1826 | 16.1826 |
| d17 | 84.6170 | 92.6506 | 99.4616 |
| d24 | 55.2948 | 27.1697 | 3.4633 |
| d32 | 32.4719 | 52.5601 | 69.4517 |
| Bf | 192.5863 | 192.5852 | 192.5840 |
| β | 10.1364 | −0.1648 | −0.1932 |
| D0 | 9136.0248 | 9136.0291 | 9136.0342 |
| d8 | 188.2824 | 188.2824 | 188.2824 |
| d14 | 2.3228 | 2.3228 | 2.3228 |
| d17 | 84.6170 | 92.6506 | 99.4616 |
| d24 | 55.2948 | 27.1697 | 3.4633 |
| d32 | 32.4719 | 52.5601 | 69.4517 |
| Bf | 192.5867 | 192.5857 | 192.5844 |

(Condition-corresponding numerical values)

(1) $f_{11}/f_w = 0.29$
(2) $f_{10} = 895.4$; $f_{10}/f_w = 0.75$
  $f_{10} = 776.3$; $f_{10}/f_w = 0.65$
(3) $|\beta_{20}| = 1.22$
(4) $|\beta_{30}| = 1.01$
(5) $\theta_w/\phi_{10} = 5.0 \times 10^{-3}$
(6) Positive lens L1; $vd = 82.56$
  Positive lens L2; $vd = 82.56$
  Positive lens L4; $vd = 82.56$ Embodiment 3

Figure 3:
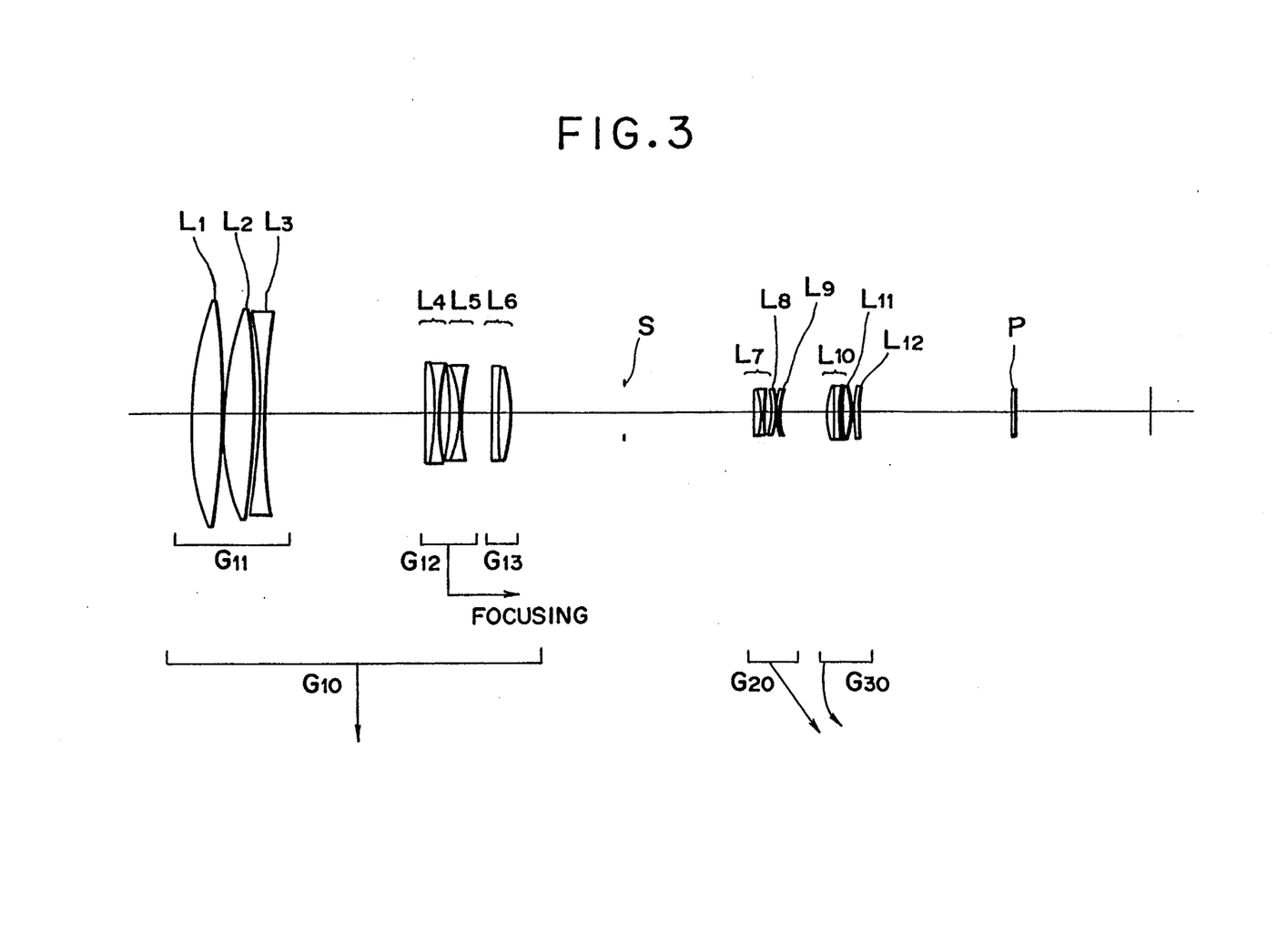
FIG. 3 shows the lens construction of a third embodiment of the present invention.

The lens construction of Embodiment 3 of the present invention is shown in FIG. 3. This embodiment comprises, in succession from the object side, a first lens unit G10 having a lens group G11 comprising a biconvex lens L1, a biconvex lens L2 and a biconcave lens L3, a lens group G12 comprising a cemented lens L4 comprising a positive lens and a negative lens cemented together, and a cemented lens L5 comprising a positive lens and a negative lens cemented together, and a lens group G13 comprising a cemented lens L6 comprising a negative lens and a positive lens cemented together, an aperture stop S, a second lens unit G20 having a cemented lens L7 comprising a positive lens and a negative lens cemented together, a negative meniscus lens L8 and a positive meniscus lens L9, a third lens unit G30 having a cemented lens L10 comprising a positive lens and a negative lens cemented together, a biconvex lens L11 and a positive meniscus lens L12, and a filter P.

The numerical data of Embodiment 3 of the present invention are shown below. In the table below, f represents the focal length, and $F_{NO}$ represents the F number. The numbers at the left end represent the order from the object side, r represents the radius of curvature of each lens surface, d represents the thickness of each lens or the spacing between adjacent lens surfaces, $v$ represents the Abbe number of each lens, n represents the refractive index of each lens for d line ($\lambda = 587.6$ nm), $\beta$ represents the photographing magnification at a close distance, d0 represents the distance form the object to the surface most adjacent to the object side, and Bf represents the back focal length.

(Values of Various Data of Embodiment 3)
f = 1200–1700
$\beta = -0.14 - -0.19$
$F_{NO} = 5.8-8.3$
Telephoto ratio = 0.77–0.55

TABLE 3

| | r | d | v | n |
|---|---|---|---|---|
| 1 | 334.070 | 29.00 | 82.6 | 1.49782 |
| 2 | −697.105 | 0.30 | | |
| 3 | 272.401 | 29.00 | 82.6 | 1.49782 |
| 4 | −738.737 | 5.40 | | |
| 5 | −622.569 | 8.00 | 35.2 | 1.74950 |
| 6 | 755.386 | (d6) | | |
| 7 | 1509.901 | 8.50 | 25.5 | 1.80458 |
| 8 | −270.000 | 4.90 | 48.1 | 1.71700 |
| 9 | 211.997 | 9.00 | | |
| 10 | −284.490 | 10.52 | 25.5 | 1.80458 |
| 11 | −114.043 | 3.00 | 39.6 | 1.80454 |
| 12 | 664.955 | (d12) | | |
| 13 | 6972.539 | 6.19 | 35.2 | 1.74950 |
| 14 | 404.029 | 12.00 | 82.6 | 1.49782 |
| 15 | −192.298 | (d15) | | |
| 16 | 200.063 | 7.25 | 28.3 | 1.74000 |
| 17 | −111.252 | 2.88 | 49.5 | 1.74443 |
| 18 | 120.213 | 6.26 | | |
| 19 | −162.834 | 3.68 | 47.5 | 1.78797 |
| 20 | 586.778 | 0.10 | | |
| 21 | 56.717 | 4.00 | 58.5 | 1.65160 |
| 22 | 55.892 | (d22) | | |
| 23 | 93.044 | 7.57 | 60.0 | 1.64000 |
| 24 | −258.116 | 3.40 | 40.9 | 1.79631 |
| 25 | 98.248 | 4.25 | | |
| 26 | 272.130 | 6.89 | 70.2 | 1.48749 |
| 27 | −133.308 | 4.25 | | |
| 28 | 121.945 | 4.85 | 70.2 | 1.48749 |
| 29 | 631.415 | 50.00 | | |
| 30 | 0.000 | (d30) | | |
| 31 | 0.000 | 2.00 | 64.1 | 1.51680 |
| 32 | 0.000 | (Bf) | | |

(variable spacing for changing the focal length)

| F | 1199.9096 | 1450.0000 | 1700.0000 |
|---|---|---|---|
| D0 | ∞ | ∞ | ∞ |
| d6 | 154.7133 | 154.7133 | 154.7133 |
| d12 | 27.9834 | 27.9834 | 27.9834 |
| d15 | 233.7516 | 244.9509 | 253.3945 |
| d22 | 48.2579 | 23.6670 | 2.8055 |
| d30 | 96.4065 | 109.7981 | 122.2160 |
| Bf | 132.9194 | 132.9194 | 132.9194 |
| β | −0.1381 | −0.1669 | −0.1957 |
| D0 | 9072.7778 | 9072.7779 | 9072.7778 |
| d6 | 170.8980 | 170.8980 | 170.8980 |
| d12 | 11.7987 | 11.7987 | 11.7987 |
| d15 | 233.7516 | 244.9509 | 253.3945 |
| d22 | 48.2579 | 23.6670 | 2.8055 |
| d30 | 96.4065 | 109.7981 | 122.2160 |
| Bf | 132.9198 | 132.9199 | 132.9201 |

(Condition-corresponding numerical values)

(1) $f_{11}/f_w = 0.31$
(2) $f_{10} = 1200.2$; $f_{10}/f_w = 1.00$
  $f_{10} = 989.4$; $f_{10}/f_w = 0.84$
(3) $|\beta_{20}| = 1.00$

TABLE 3-continued (4) $|\beta_{30}| = 1.00$
(5) $\theta_w/\phi_{10} = 5.0 \times 10^{-3}$
(6) Positive lens L1; $vd = 82.56$
    Positive lens L2; $vd = 82.56$

Embodiment 4

Figure 4:
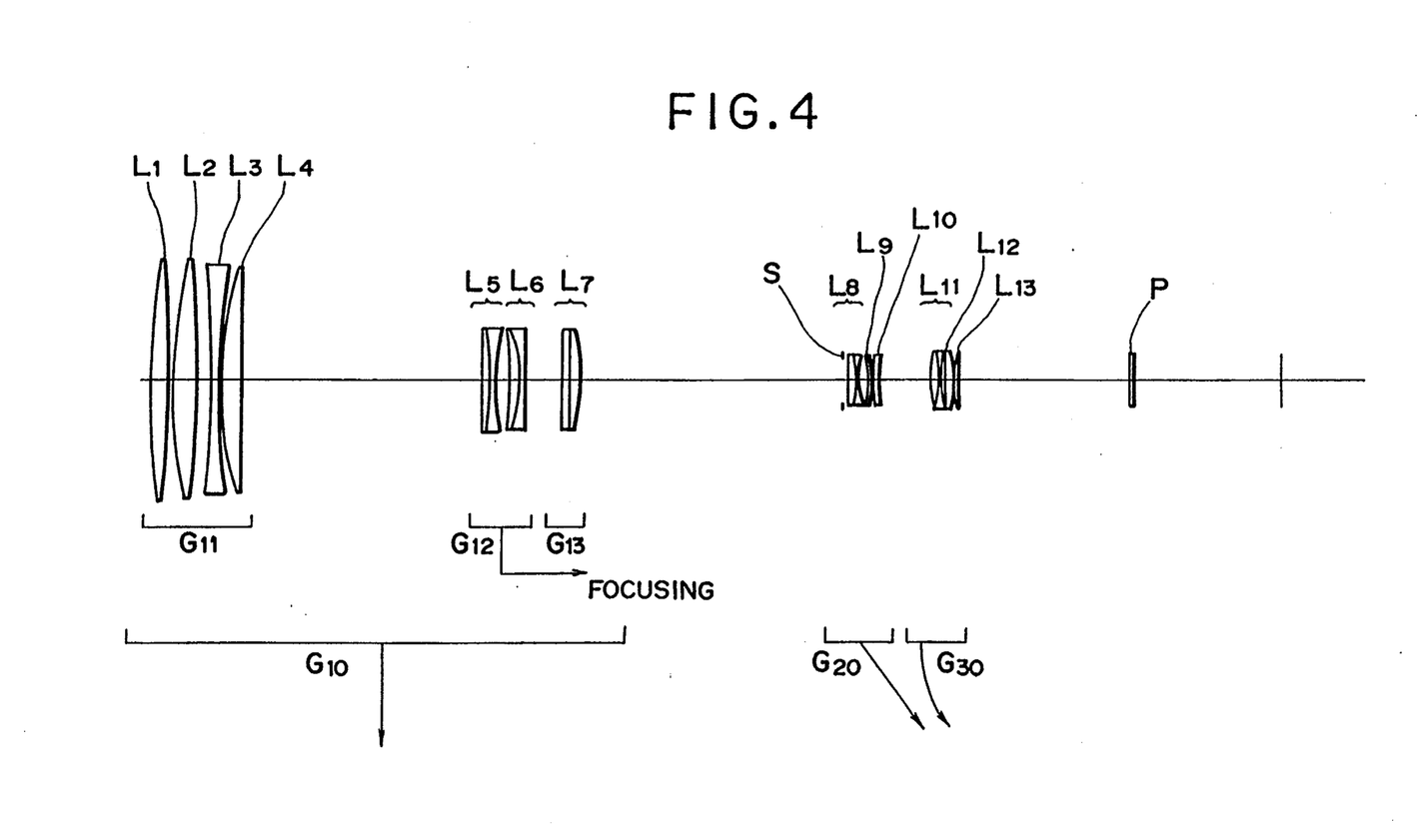
FIG. 4 shows the lens construction of a fourth embodiment of the present invention.

The lens construction of Embodiment 4 of the present invention is shown in FIG. 4. This embodiment comprises, in succession from the object side, a first lens unit G10 having a lens group G11 comprising a biconvex lens L1, a biconvex lens L2, a biconcave lens L3 and a positive meniscus lens L4 having its strong convex surface facing the object side, a lens group G12 comprising a cemented lens L5 comprising a positive lens and a negative lens cemented together, and a cemented lens L6 comprising a positive lens and a negative lens cemented together, and a lens group G13 comprising a cemented lens L7 comprising a negative lens and a positive lens cemented together, an aperture stop S, a second lens unit G20 comprising a cemented lens L8 comprising a positive lens and a negative lens cemented together, a negative meniscus lens L9 and a positive meniscus lens L10, a third lens unit G30 having a cemented lens L11 comprising a positive lens and a negative lens cemented together, a biconvex lens L12 and a biconvex lens L13, and a filter P.

The various data of Embodiment 4 of the present invention are shown below. In the table below, f represents the focal length, and $F_{NO}$ represents the F number. The numbers at the left end represents the order from the object side, r represents the radius of curvature of each lens surface, d represents the thickness of each lens or the spacing between adjacent lens surfaces, $v$ represents the Abbe number of each lens, n represents the refractive index of each lens for d line ($\lambda = 587.6$ nm), $\beta$ represents the photographing magnification at a close distance, d0 represents the distance from the object to the surface most adjacent to the object side, and Bf represents the back focal length.

(Values of Various Data of Embodiment 4)
f = 1200–1700
$\beta = -0.14$––$0.19$
$F_{NO} = 5.8$–$8.3$
Telephoto ratio = 0.83–0.58

TABLE 4

| | r | d | $v$ | n |
|---|---|---|---|---|
| 1 | 815.742 | 13.30 | 64.1 | 1.51680 |
| 2 | −1530.671 | 4.80 | | |
| 3 | 454.790 | 21.80 | 82.6 | 1.49782 |
| 4 | −797.345 | 13.57 | | |
| 5 | −688.538 | 7.00 | 35.2 | 1.74950 |
| 6 | 928.580 | 0.30 | | |
| 7 | 352.840 | 17.30 | 82.6 | 1.49782 |
| 8 | 0.000 | (d8) | | |
| 9 | −1091.334 | 6.60 | 25.5 | 1.80458 |
| 10 | −326.047 | 5.60 | 55.6 | 1.69680 |
| 11 | 202.657 | 11.15 | | |
| 12 | −396.087 | 9.20 | 25.5 | 1.80458 |
| 13 | −140.999 | 4.10 | 40.9 | 1.79631 |
| 14 | −2386.808 | (d14) | | |
| 15 | 26135.118 | 6.40 | 35.2 | 1.74950 |
| 16 | 489.367 | 10.30 | 82.6 | 1.49782 |
| 17 | −194.419 | (d17) | | |
| 18 | 201.277 | 7.30 | 28.2 | 1.74000 |
| 19 | −118.083 | 2.90 | 49.5 | 1.74443 |
| 20 | 119.989 | 6.30 | | |
| 21 | −163.060 | 3.70 | 47.5 | 1.78797 |
| 22 | 581.004 | 0.10 | | |
| 23 | 66.427 | 4.00 | 58.5 | 1.65160 |

TABLE 4-continued

| 24 | 65.914 | (d24) | | |
|---|---|---|---|---|
| 25 | 94.244 | 7.60 | 57.0 | 1.62280 |
| 26 | −249.595 | 3.40 | 39.6 | 1.80454 |
| 27 | 102.973 | 3.30 | | |
| 28 | 964.783 | 6.90 | 70.4 | 1.48749 |
| 29 | −156.566 | 0.10 | | |
| 30 | 126.183 | 4.80 | 70.4 | 1.48749 |
| 31 | −389.436 | 50.00 | | |
| 32 | 0.000 | (d32) | | |
| 33 | 0.000 | 2.00 | 64.1 | 1.51680 |
| 34 | 0.000 | 90.00 | | |
| 35 | 0.000 | (Bf) | | |

| (variable spacing for changing focal length) | | | |
|---|---|---|---|
| F | 1200.0061 | 1450.0005 | 1699.9996 |
| D0 | ∞ | ∞ | ∞ |
| d8 | 212.2808 | 212.2808 | 212.2808 |
| d14 | 31.5512 | 31.5512 | 31.5512 |
| d17 | 233.9327 | 245.4642 | 253.9102 |
| d24 | 48.6876 | 24.1954 | 3.3353 |
| d32 | 100.6661 | 113.6268 | 126.0409 |
| Bf | 43.2984 | 43.2983 | 43.2983 |
| $\beta$ | −0.1401 | −0.1693 | −0.1985 |
| D0 | 9005.7676 | 9005.7677 | 9005.7677 |
| d8 | 235.9241 | 235.9241 | 235.9241 |
| d14 | 7.9079 | 7.9079 | 7.9079 |
| d17 | 233.9327 | 245.4642 | 253.9102 |
| d24 | 48.6876 | 24.1954 | 3.3353 |
| d32 | 100.6661 | 113.6268 | 126.0409 |
| Bf | 43.2985 | 43.2984 | 43.2985 |

(Condition-corresponding numerical values)

(1) $f_{11}/f_w = 0.38$
(2) $f_{10} = 1201.0$; $f_{10}/f_w = 1.00$
    $f_{10} = 1007.0$; $f_{10}/f_w = 0.84$
(3) $|\beta_{20}| = 1.00$
(4) $|\beta_{30}| = 1.00$
(5) $\theta_w/\phi_{10} = 5.0 \times 10^{-3}$
(6) Positive lens L2; $vd = 82.56$
    Positive lens L4; $vd = 82.56$ In each of the above-described embodiments, the lens group G13 in the first lens unit G10 may be moved perpendicularly to the optical axis to thereby obtain the image stabilizing effect. The aperture stop S may be disposed anywhere in the image side space from the lens group G12 in the first lens unit G10. Further, a fixed stop is disposed between the third lens unit G30 and the filter P.

As described above, according to each embodiment of the present invention, there can be provided a super-telephoto zoom lens which is a zoom lens having a very long focal length of 800 mm–1700 mm and yet which has a sufficiently bright F number and a telephoto ratio of minimum 0.51, very small as compared with that of the conventional zoom lens and which is very good in operability.

What is claimed is:

1. A super-telephoto zoom lens including, in succession from the object side, a first lens unit G10 having positive refractive power, a second lens unit G20 having negative refractive power, and a third lens unit G30 having positive refractive power, said first lens unit G10 being fixed relative to the image plane and said second lens unit G20 and said third lens unit G30 being moved so as to narrow the air space therebetween during changing the focal length from the wide angle end to the telephoto end, said first lens unit G10 including, in succession from the object side, a lens group G11 having positive refractive power, a lens group G12 having negative refractive power, and a lens group G13 having positive refractive power, said lens group G12 being moved in the direction of the optical axis thereof to thereby effect focusing, said zoom lens being designed to satisfy the following conditions:

$$0.15 \leq f_{11}/f_w \leq 0.40,$$

$$0.5 \leq f_{10}/f_w \leq 1.1,$$

where
- $f_{11}$: the focal length of said lens group G11 in said first lens unit G10;
- $f_{10}$: the focal length of said first lens unit G10;
- $f_w$: the focal length of the whole system of said super-telephoto zoom lens at the wide angle end.

2. A super-telephoto zoom lens according to claim 1, designed to satisfy the following condition:

$$0.9 \leq |\beta_{20}| \leq 1.4$$

where $\beta_{20}$ is the magnification used of said second lens unit G20 at the wide angle end.

3. A super-telephoto zoom lens according to claim 1, designed to satisfy the following condition:

$$0.9 \leq |\beta_{30}| \leq 1.4,$$

where $\beta_{30}$ is the magnification used of said third lens unit G30 at the wide angle end.

4. A super-telephoto zoom lens according to claim 1, designed to satisfy the following condition:

$$4.0 \times 10^{-6} < \theta_w/\phi_{10} < 9.0 \times 10^{-3},$$

where $\phi_{10}$ is the effective diameter of that lens surface in said first lens unit G10 which is most adjacent to the object side, and $\theta_w$ is the half angle of view at said wide angle end.

5. A super-telephoto zoom lens according to claim 1, wherein the lens group G11 in said first lens unit G10 includes at least two positive lens components and one or more negative lens components, and is designed to satisfy the following condition:

$$\nu d > 70,$$

where $\nu d$ is the Abbe number of said positive lens components.

6. A super-telephoto zoom lens according to claim 1, wherein each of said lens group G11, said lens group G12 and said lens group G13 in said first lens unit G10, said second lens unit G20 and said third lens unit G30 includes at least one positive lens component and at least one negative lens component.

7. A super-telephoto zoom lens according to claim 6, wherein each of said lens group G12 and said lens group G13 in said first lens unit G10, said second lens unit G20 and said third lens unit G30 includes at least one cemented surface.

8. A super-telephoto zoom lens according to claim 1, wherein said lens group G13 in said first lens unit G10 is provided for movement in a direction perpendicular to said optical axis.

9. A super-telephoto zoom lens according to claim 1, wherein an aperture stop is disposed at an image side nearer than said lens group $G_{12}$ in said first lens unit $G_{10}$.

10. A super-telephoto zoom lens according to claim 1, wherein a filter is disposed at an image side nearer than said third lens unit $G_{30}$.

* * * * *